(12) United States Patent
Harikrishnan et al.

(10) Patent No.: US 11,245,610 B2
(45) Date of Patent: Feb. 8, 2022

(54) AUTOMATED CONNECTIVITY TESTING AMONG A LARGE NUMBER OF SERVERS

(71) Applicant: T-Mobile USA, Inc., Bellevue, WA (US)

(72) Inventors: Sandeep Shankar Harikrishnan, Bothell, WA (US); Hamza Hydri Syed, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 48 days.

(21) Appl. No.: 16/216,790

(22) Filed: Dec. 11, 2018

(65) Prior Publication Data

US 2020/0186456 A1 Jun. 11, 2020

(51) Int. Cl.
*H04L 12/26* (2006.01)
*H04L 29/06* (2006.01)
*H04L 12/24* (2006.01)

(52) U.S. Cl.
CPC .............. *H04L 43/50* (2013.01); *H04L 41/12* (2013.01); *H04L 43/065* (2013.01); *H04L 43/0811* (2013.01); *H04L 63/02* (2013.01)

(58) Field of Classification Search
None
See application file for complete search history.

(56) References Cited

U.S. PATENT DOCUMENTS

| 8,289,845 | B1 * | 10/2012 | Baldonado | .............. H04L 43/50 370/229 |
| 2009/0279673 | A1 * | 11/2009 | Maffre | .................... H04L 43/50 379/1.03 |

* cited by examiner

Primary Examiner — Willie J Daniel, Jr.
(74) Attorney, Agent, or Firm — Lee & Hayes, P.C.

(57) ABSTRACT

A technique of testing connectivity between a plurality of source components, e.g., source servers, and a plurality of destination components, e.g., destination servers, in a network is discussed herein. A request to test connectivity between a plurality of source components and a plurality of destination components is received, the request being directed to testing the connectivity between each source component and each destination component. Connectivity between each source component and each destination component is tested, with multiple tests being conducted substantially simultaneously. Based at least in part on the testing, a report is generated related to connectivity between the plurality of source components and the plurality of destination components. The ranges of IP addresses for the source components and ranges of IP addresses of the destination components are provided using a Comma-Separated Values (CSV)-based input.

20 Claims, 6 Drawing Sheets

AUTOMATED CONNECTIVITY TESTING AMONG A LARGE NUMBER OF SERVERS

BACKGROUND

In recent years, mobile telecommunication devices have advanced from offering simple voice calling services within wireless communication networks to providing users with many new features. Mobile telecommunication devices now provide messaging services such as email, text messaging, and instant messaging; data services such as internet browsing; media services such as storing and playing a library of favorite songs; location services; and many others. In addition to the new features provided by the mobile telecommunication devices, users of such mobile telecommunication devices have greatly increased. Such an increase in users is only expected to continue and, in fact, it is expected that there could be a growth rate of twenty times more users in the next few years alone.

As the number of users of mobile telecommunication devices has increased and continues to increase, the size of wireless communication networks also continues to increase. As users and functionality for the wireless communication networks increases, the number of components, e.g., servers, and complexity of such components also grows. Thus, testing of the various components is also increasing. For example, such components often need to communicate with each other in order to provide services to users of the wireless communication networks and thus, connectivity, e.g., Internet Protocol (IP) connectivity and/or firewall connectivity, among components may need to be tested. For example, as new components are added to the wireless communication networks, updates are provided for the various components, etc., the connectivity among the various components may need to be tested and retested.

Due to the large number of components within wireless communication networks, manual testing of connectivity among the various components can be very time consuming. For example, if connectivity from 150 source components needs to be tested with respect to 50 destination components, then 7500 connections need to be tested. For example, each source component, e.g., source server, may need to have a firewall connectivity test with respect to each of the 50 destination components, e.g., destination servers. Generally, each test for each connection needs to be manually initiated and run, thus resulting in each test for each connection being run sequentially. For such an example, if it takes approximately one to one and one-half minutes to enter required parameters and run a test for each of the 7500 connections, this results in a large amount of testing, e.g., on the order of around one hundred hours. This is not efficient or economical.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
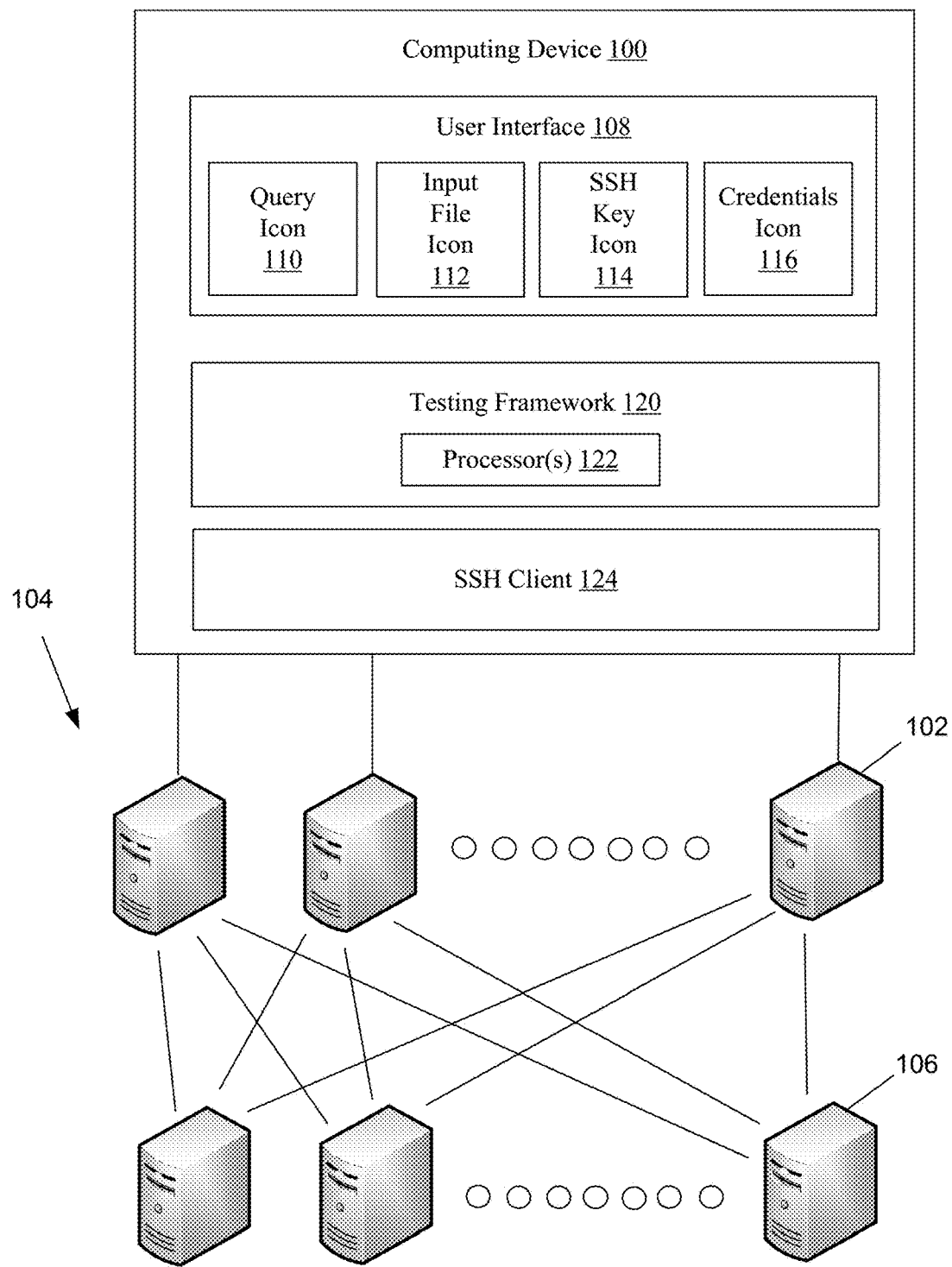
FIG. 1 schematically illustrates an example arrangement that may be used to select various source components and destination components in a network for testing connectivity among the components, in accordance with various configurations.

Described herein are techniques and architecture for submitting test requests for connectivity among a plurality of components within a network, e.g., a wireless communication network, and operating many of the connectivity tests in parallel among the various components. Ranges of Internet Protocol (IP) addresses of source components and ranges of IP addresses of destination components are input using a user interface (UI) to create an input file. A port at the source components is also input using the user interface. The input file may then be processed to perform connectivity tests among the source components and the destination components In particular, when a large number of source components within a network, e.g., servers within a wireless communication network, need to have their connectivity tested with respect to a large number of destination components within the network, e.g., servers within the wireless communication network, an input file may be created by a user, where a range or ranges of IP addresses of the source components are input. The IP addresses of the source components may be input in accordance with a programming language that is based upon Comma-Separated Values (CSV). Thus, the ranges of IP addresses of the source components are separated by commas.

The user also inputs, in accordance with the programming language, a range or ranges of IP addresses for destination components. Thus, the ranges of IP addresses of the destination components are also separated by commas. An appropriate port may be listed after the ranges of the IP addresses of the destination servers and may be separated from the ranges of the IP addresses for the destination servers by a colon.

Upon completion of the input file, the user may upload the input file using the user interface. In configurations, the user may also select a type of file for an output file, e.g., the results, to be presented to the user. For example, the user may choose to have the results reported in a pdf file, a spreadsheet file, Word® file, etc.

In configurations, when the input file is uploaded for testing, a secure shell (SSH) private key may be required based upon the configuration of the components, e.g., servers. Thus, in such configurations, the user may also input the SSH private key using the user interface. Additionally, or alternatively, the user may input credentials such as a login identifier (ID) and a password. Once all of the information has been properly input, the user may then run the connectivity tests. Many of the connectivity tests among source components and destination components may be run in parallel, e.g., substantially simultaneously.

Thus, connectivity among the various source components of a network and destination components of the network may be handled automatically and performed in a greatly reduced amount of time compared to individually and sequentially testing connectivity for each source component with respect to each destination component. This saves vast amounts of computing resources, human resources, etc., as well as resulting in vastly improved efficiencies.

FIG. 1 schematically illustrates an example arrangement that includes a computing device 100 that may be used to select various source components 102, e.g., source servers (referred to herein as source servers 102) in a network 104, e.g., a wireless communication network, for which tests, e.g., Internet Protocol (IP) connectivity and/or firewall connectivity tests are desired to be performed with respect to various destination components 106, e.g., destination servers (referred to herein as destination servers 106) in the network 104. The computing device 100 may provide a user interface 108 to a user (not illustrated) of the computing device 100. The user interface 108 may provide a query icon 110 for the user to input a query, as will be discussed further herein. The query may be in the form of a request for desired connectivity test(s) and may include one or more ranges of IP addresses of source servers 102 and one or more ranges of IP addresses of destination servers 106, along with a desired port on the destination servers, as will be discussed further herein.

If the amount of source servers 102 and/or destination servers 106 is large, then the user interface may provide an input file icon 112 for the user to input an input file, e.g., a Comma-Separated Value (CSV)-based file that has been separately created and lists ranges of IP addresses of source servers 102 and ranges of IP addresses of destination servers 106, as well as the appropriate port at the destination servers 106, for the desired connectivity test(s). Thus, the input file icon 112 may allow for the user to upload a CSV-based file. If a Secure Shell (SSH) private key is required for testing purposes, then the user interface 108 may include a SSH icon 114 for the user to enter the appropriate SSH private key. Additionally, in configurations, the user interface 108 may provide a credentials icon 116 for the user to, in addition to, or alternatively, input credentials, e.g., a user login and password.

The computing device 100 further includes a testing framework 120. In configurations, the testing framework 120 may be configured as an Avalanche framework (which is a framework for parallel and distributed computation). The testing framework 120 may include one or more processor(s) 122. The one or more processor(s) 122 may be configured to process the query and/or the CSV input file. The one or more processor(s) 122 may also be configured to perform multi-session testing, e.g., multiple testing of connectivity among multiple source servers 102 and destination servers 106 in parallel. Additionally, the one or more processor(s) 122 may be configured to aggregate test results, e.g., aggregate connectivity results from the connectivity tests and output an output file in the form of a report for the testing results. In configurations, one or more of the processors 122 may be dedicated for each task, e.g., one or more processor(s) 122 may be configured and dedicated to process the query and/or the CSV-based input file, one or more processor(s) 122 may be configured and dedicated to perform the multi-session testing, and one or more processor(s) 122 may be configured and dedicated to aggregate the test results and output an output file in the form of a report for the testing results.

The computing device 100 may also include a SSH client 124 for processing the SSH private key when such a SSH private key is required for accessing one or more servers 102, 106 for testing purposes. Thus, once the computing device 100 has processed the inputs provided by the user, then the source servers 102 and the destination servers 106 may be tested for various features, e.g., IP connectivity and/or firewall connectivity between the source servers 102 and the destination servers 106.

In configurations, the testing framework 120 and/or the SSH client 124 may be part of the computing device 100 or may be part of a separate computing device (not illustrated), e.g., a server, that may be accessed by the computing device 100. Thus, in such configurations, the computing device 100 and the separate computing device that includes the testing framework 120 and/or the SSH client 124 may be located in different locations.

Additionally, in configurations, the source components 102 and the destination components 106 may comprise components in a network other than servers. For example, the source components may comprise computing devices, servers, etc., while the destination components may comprise peripheral devices, e.g., printers, output devices, fax machines, etc.

Figure 2:
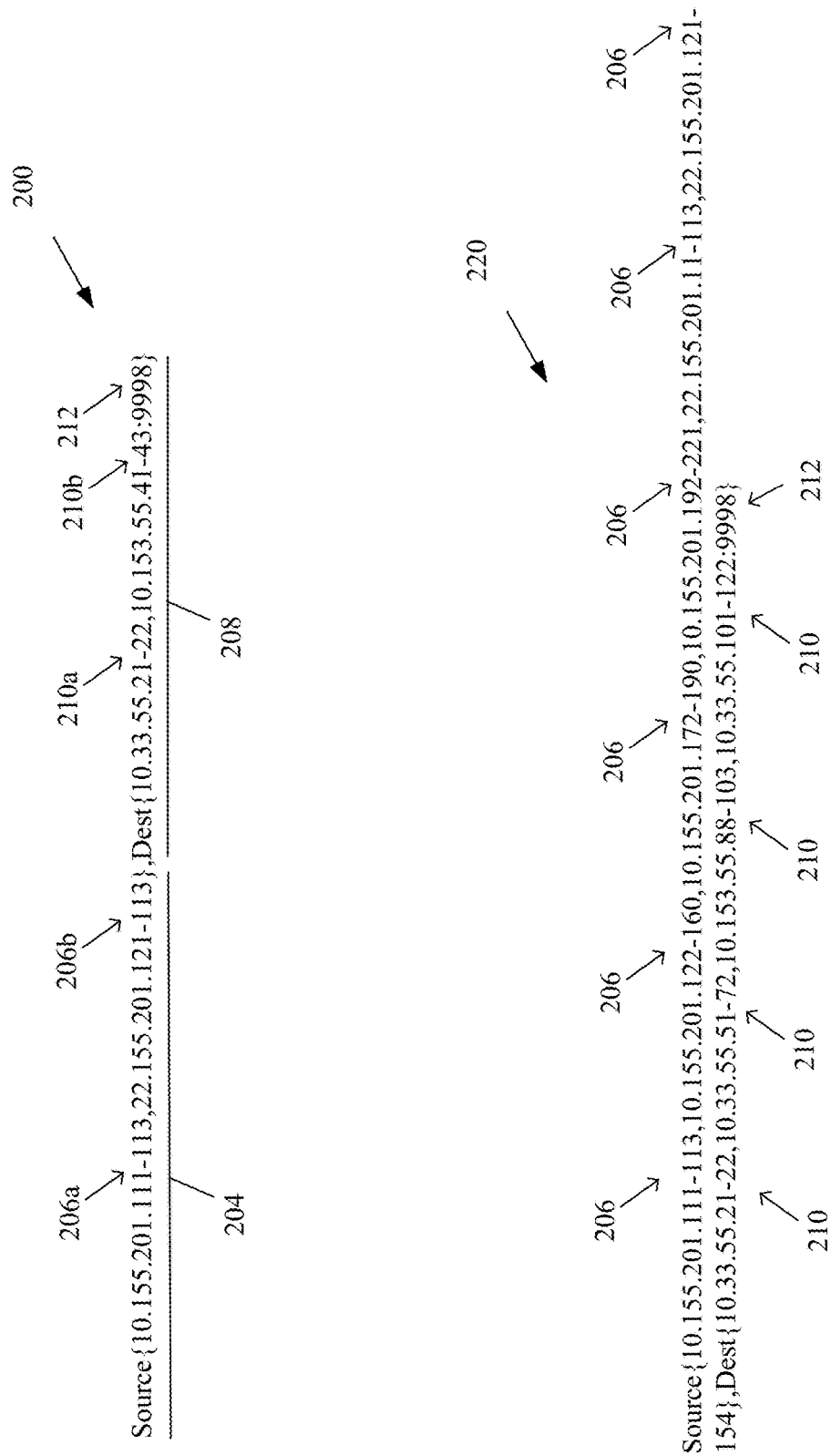
FIG. 2 illustrates an example of an input and an input file configured as a Comma-Separated Values (CSV)-based input for testing between source components and destination components, in accordance with various configurations.

FIG. 2 illustrates an example of an input 202 configured as a CSV-based input for testing between source components and destination components. The input 202 may include a source portion 204 that includes one or more ranges 206 (e.g., ranges 206a and 206b) of IP addresses for source components, e.g., source servers 102, where each range of IP addresses is separated by a comma. The input 202 also includes a destination portion 208 that includes one or more ranges 210 (e.g., ranges 210a, 210b) of IP addresses for destination components, e.g., destination servers 106, where each range of IP addresses is separated by a comma. As can be seen, the source portion 204 and the destination portion 208 are separated by a comma. The second portion 208 also includes a port 212 for the destination components. The port 212 is separated from the ranges 210 by a colon. The input 202 may be input using the user interface 108 and the query icon 110.

If the number of ranges 206 of IP addresses and/or the number of ranges 210 of IP addresses is large, the user may prepare an input file 220. For example, the input file 220 may include ranges 206 of IP addresses for source components, e.g., source servers 102, and ranges 210 of IP addresses for destination components, e.g., destination servers 106 between which IP connectivity and/or firewall connectivity is to be tested. The input file 220 also includes a port 212 for the destination components. While the input file 220 is illustrated with only a few ranges 206 and 210, the input file may include many, many more ranges 206 and 210 (e.g., on the order of tens, hundreds, thousands, etc.) depending on the number of components to be tested. The input file 220 may be input using the user interface 108 and the input file icon 112.

Figure 3:
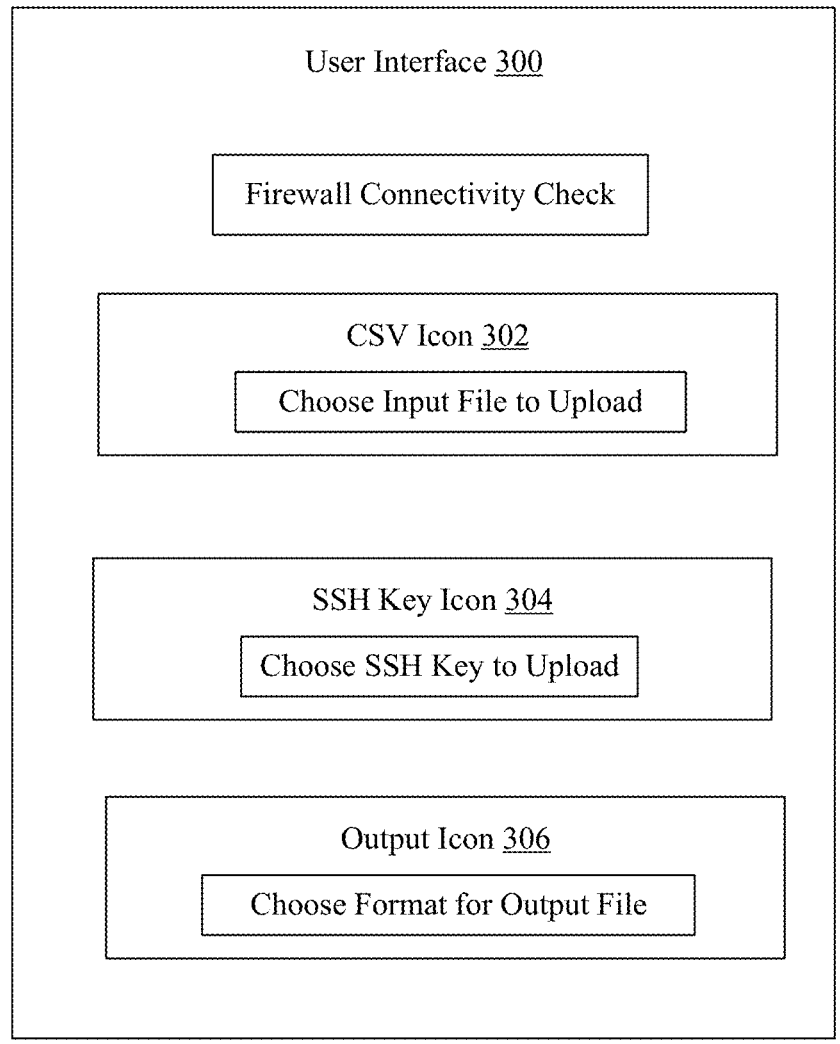
FIG. 3 illustrates an example of a user interface that may be used to initiate a firewall connectivity test among source components and destination components, in accordance with various configurations.

FIG. 3 illustrates an example of a user interface 300 that may be similar to and/or part of user interface 108 and may be used to initiate a firewall connectivity test among source components, e.g., source servers 102, and destination components, e.g., destination components 106. As can be seen, a CSV icon 302 may be provided for interaction with a user to allow the user to choose an input file, e.g., a CSV-based input file 220 as previously described with respect to FIG. 2. Likewise, if a SSH private key is required, the user interface 300 may provide a SSH icon 304 for interaction with the user to allow the user to choose a SSH private key for uploading. Once the CSV-based input file and SSH key have been chosen, then the information may be uploaded to the testing framework, e.g., testing framework 120. The testing framework may then run the connectivity test and produce an output file in the form of a report. An output icon 306 may be provided to allow the user to specify the formatting for the output file, e.g., a pdf file, a spreadsheet file, a Word® file, etc.

Figure 4:
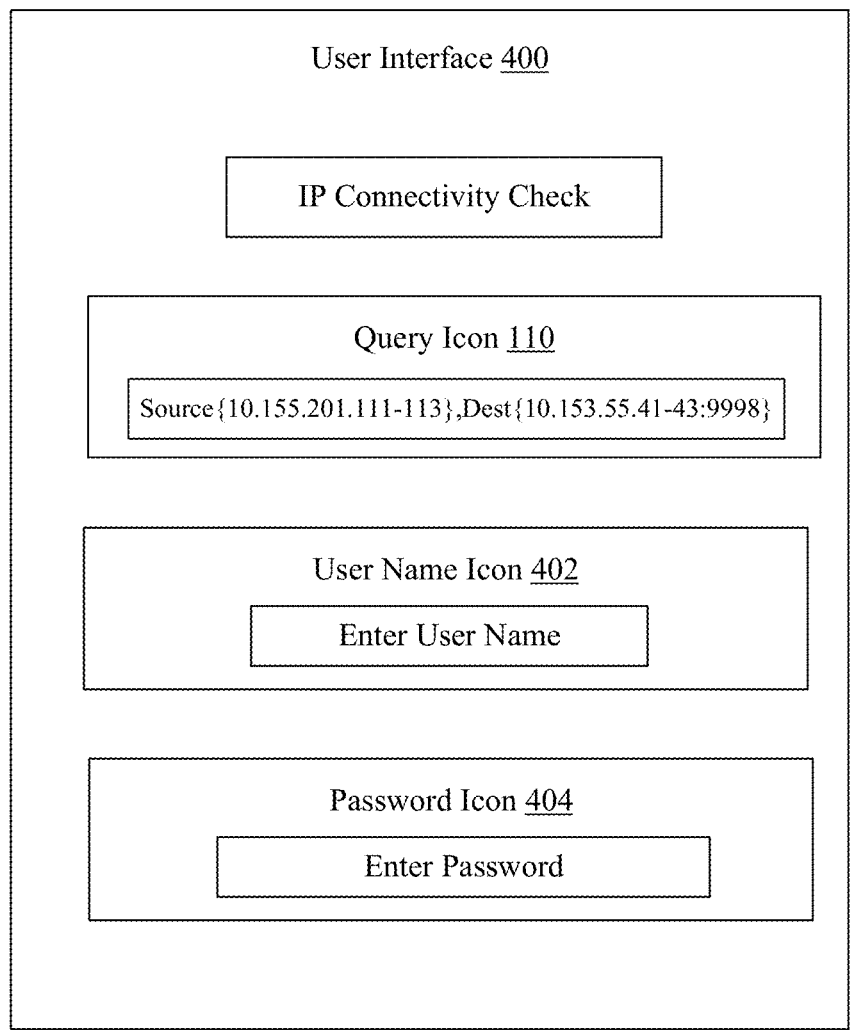
FIG. 4 illustrates another example of a user interface that may be used to initiate a firewall connectivity test among source components and destination components, in accordance with various configurations.

FIG. 4 illustrates another example of a user interface 400 that may be similar to and/or part of user interface 108 and may be used to initiate a firewall connectivity test among source components, e.g., source servers 102, and destination components, e.g., destination components 106. The user interface 400 may be used to test for IP connectivity among source components, e.g., source servers 102, and destination components, e.g., destination components 106 using the query icon 110 of FIG. 1. As can be seen, the query may input source components and destination components using the CSV-based input 202 as previously described with respect to FIG. 2. Thus, the query may be useful when only a single range (e.g., range 206) of IP addresses of source components (or just a few ranges of IP addresses of source components) and/or a single range (e.g., range 210) of IP addresses of destination components (or just a few IP addresses of destination components) need to be input for testing purposes. FIG. 4 also illustrates an example wherein login credentials may be used in order to authorize testing. Thus, the user interface 400 includes a user name input icon 402 for entering a user name, e.g., login identifier (ID), and a password input icon 404 for entering a password.

The example user inputs 300 and 400 of FIGS. 3 and 4 are merely examples and more or fewer icons may be included with each user input 300 and/or 400 if desired. For example, the user interface 400 of FIG. 4 may also include a SSH icon 304 for input by the user. Likewise, the user interface 300 may also include a user name input icon 402 and a password input icon 404. Also, in configurations, once the test results are completed, the user may be prompted as to the format for the test results report as opposed to interacting with the output icon 306 prior to testing.

Figure 5:
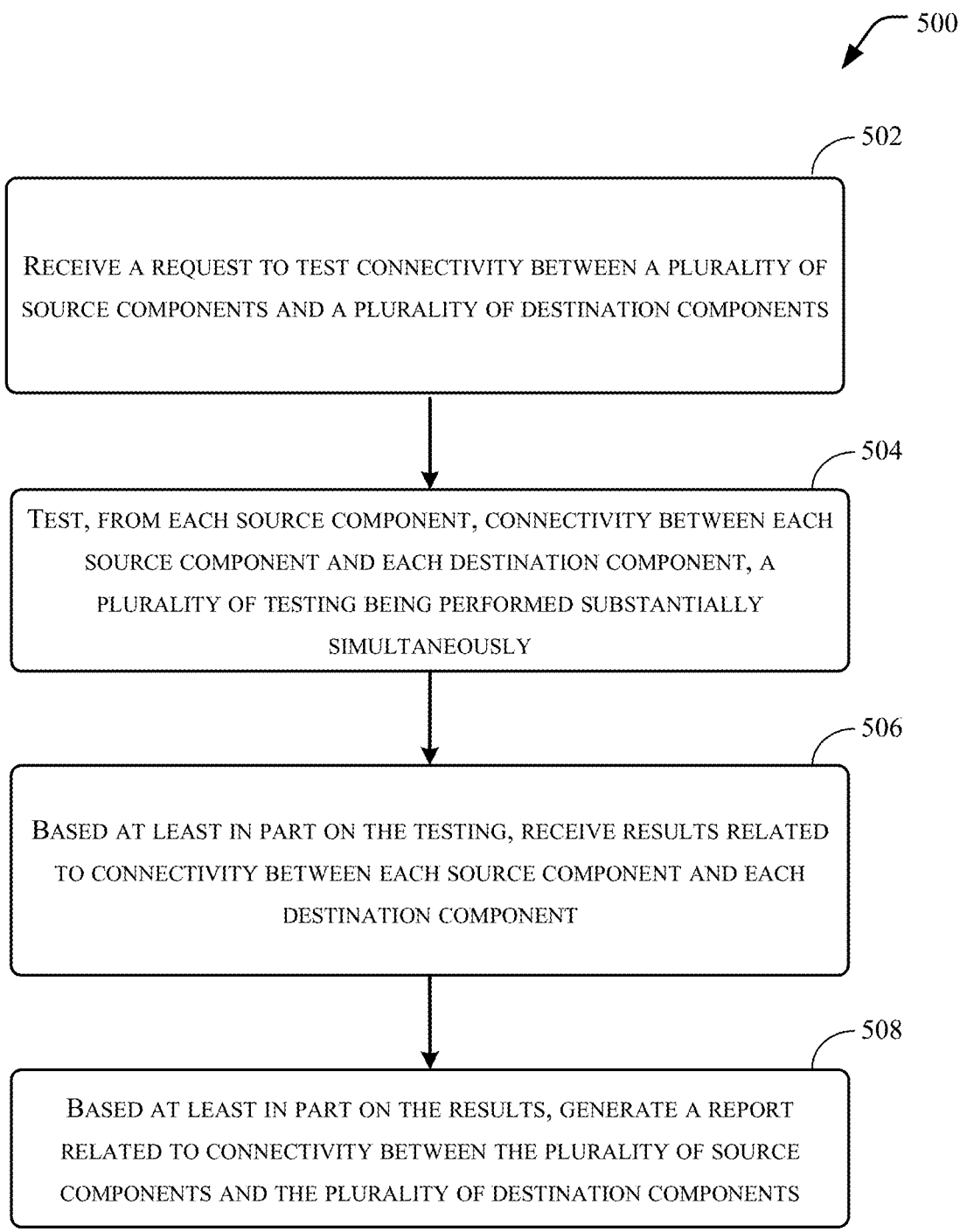
FIG. 5 is a flowchart illustrating a method of determining a location of a small cell access point in the wireless communication network of FIG. 1, in accordance with various configurations.

FIG. 5 is a flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 5 is a flow diagram illustrating an example method 500 of testing connectivity between a plurality of source components, e.g., source servers 102, and a plurality of destination components, e.g., destination servers 106, in a network, e.g., network 104. As illustrated, at block 502, a computing device, e.g., computing device 100, receives a request to test connectivity between a plurality of source components and a plurality of destination components. In configurations, a different computing device receives the request from the computing device 100. The request is directed to testing the connectivity between each source component and each destination component. At block 504, connectivity is tested, from each source component, with respect to each destination component. A plurality of the tests is performed substantially simultaneously.

At block 506, based at least in part on the testing, the computing device receives results related to connectivity between each source component and each destination component. At block 508, based at least in part on the results, a report is generated related to connectivity between the plurality of source components and the plurality of destination components.

Thus, connectivity among the various source components of a network and destination components of the network may be handled automatically and performed in a greatly reduced amount of time compared to individually and sequentially testing connectivity for each source component with respect to each destination component. This saves vast amounts of computing resources, human resources, etc., as well as resulting in vastly improved efficiencies.

Figure 6:
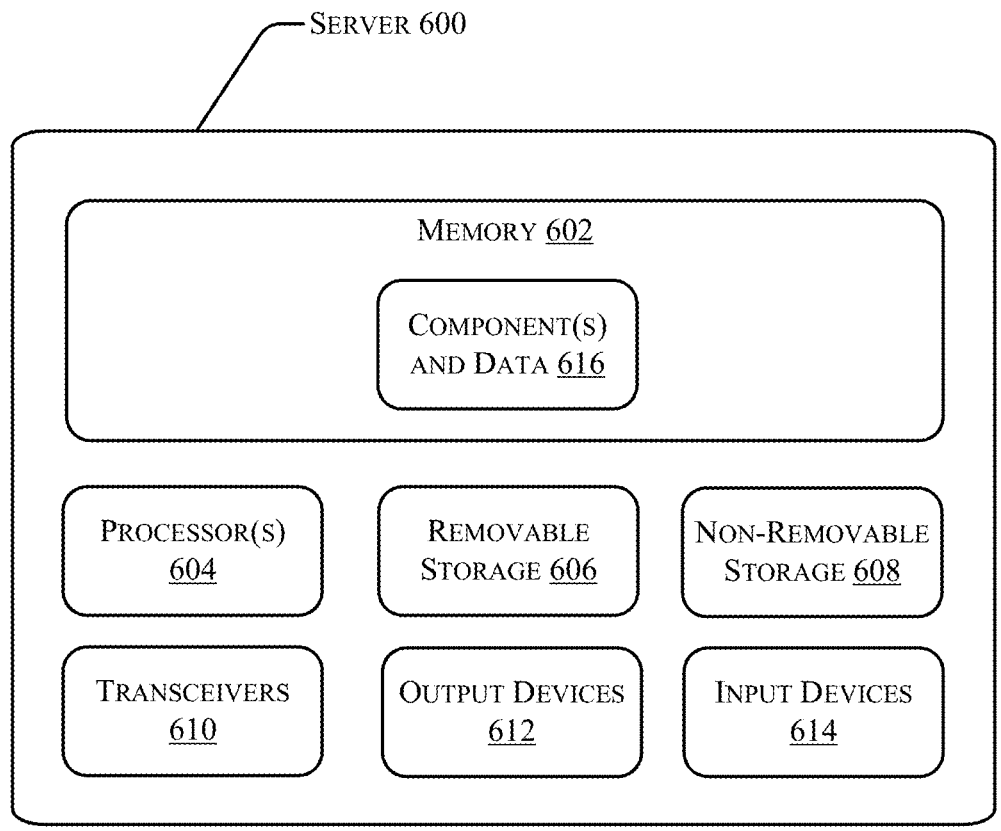
FIG. 6 schematically illustrates a component level view of a server configured for use in the wireless communication network of FIG. 1 to provide various services of the wireless communication network of FIG. 1, in accordance with various configurations.

FIG. 6 illustrates a component level view of a server 600 configured for use within a network, e.g., network 102, in order to provide various services within the wireless communication network, according to the techniques described herein. For example, the server 600 may implement testing platform 120, e.g., one or more servers 600 may be configured to implement testing platform 120. Additionally, the server 600 may represent the source servers 102 and the destination servers 106. As illustrated, the server 600 comprises a system memory 602 that may store data and one or more components and/or data 616 for interacting with mobile devices 600, e.g., mobile devices 104, as described herein. Also, the server 600 includes processor(s) 604, a removable storage 606, a non-removable storage 608, transceivers 610, output device(s) 612, and input device(s) 614.

In various implementations, system memory 602 is volatile (such as RAM), non-volatile (such as ROM, flash memory, etc.) or some combination of the two. In some implementations, the processor(s) 604 is a Central Processing Unit (CPU), a Graphics Processing Unit (GPU), or both CPU and GPU, or any other sort of processing unit.

The server 600 may also include additional data storage devices (removable and/or non-removable) such as, for example, magnetic disks, optical disks, or tape. Such additional storage is illustrated in FIG. 6 by removable storage 606 and non-removable storage 608. The one or more of the memory 602, the removable storage 606 and/or the non-removable storage 608 may include module(s) and data 616 (illustrated in the memory 602). The module(s) and data 616 may include instructions executable by, for example, the processor(s) 604.

Non-transitory computer-readable media may include volatile and nonvolatile, removable and non-removable tangible, physical media implemented in technology for storage of information, such as computer readable instructions, data structures, program modules, or other data. System memory 602, removable storage 606 and non-removable storage 608 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 600. Any such non-transitory computer-readable media may be part of the server 600.

In some implementations, the transceivers 610 include any sort of transceivers known in the art. For example, the transceivers 610 may include wired communication components, such as an Ethernet port, for communicating with other networked devices. Also, or instead, the transceivers 610 may include wireless modem(s) to facilitate wireless connectivity with other computing devices. Further, the transceivers 610 may include a radio transceiver that performs the function of transmitting and receiving radio frequency communications via an antenna.

In some implementations, the output devices 612 include any sort of output devices known in the art, such as a display (e.g., a liquid crystal display), speakers, a vibrating mechanism, or a tactile feedback mechanism. Output devices 612 also include ports for one or more peripheral devices, such as headphones, peripheral speakers, or a peripheral display.

In various implementations, input devices 614 include any sort of input devices known in the art. For example, input devices 614 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
    receiving, by a computing device, a request to test connectivity between a plurality of source components and a plurality of destination components, the request being directed to testing the connectivity between each source component of the plurality of source components and each destination component of the plurality of destination components;
    in response to receiving the request, automatically determining a plurality of pairings including a respective pairing between each source component of the plurality of source components and each destination component of the plurality of destination components;
    testing by the plurality of source components, connectivity between the corresponding source component and the corresponding destination component of each respective pairing of the plurality of pairings, a plurality of the testing being performed substantially simultaneously;
    based at least in part on the testing, receiving, by the computing device, results related to connectivity between each source component of the plurality of source components and each destination component of the plurality of destination components; and
    based at least in part on the results, generating a report related to connectivity between the plurality of source components and the plurality of destination components.

2. The method of claim 1, wherein the request identifies one or more ranges of Internet Protocol (IP) addresses for the plurality of source components.

3. The method of claim 2, wherein the request identifies multiple ranges of IP addresses for the plurality of source components, the multiple ranges of IP addresses for the plurality of source components being provided with Comma-Separated Values (CSVs).

4. The method of claim 1, wherein the request identifies one or more ranges of IP addresses for the plurality of destination components.

5. The method of claim 4, wherein the request identifies multiple ranges of IP addresses for the plurality of destination components, the multiple ranges of IP addresses for the plurality of destination components being provided with CSVs.

6. The method of claim 5, wherein a port is identified after each range of IP addresses for the plurality of destination components.

7. The method of claim 1, wherein the request comprises requesting testing of firewall connectivity with respect to the plurality of destination components.

8. A non-transitory storage medium comprising instructions stored thereon, the instructions being executable by one or more processors to:
    receive a request to test connectivity between a plurality of source components and a plurality of destination components, the request being directed to testing the connectivity between each source component of the plurality of source components and each destination component of the plurality of destination components;
    in response to receiving the request, automatically determine a plurality of pairings including a respective pairing between each source component of the plurality of source components and each destination component of the plurality of destination components;
    test connectivity between the corresponding source component and the corresponding destination component of each respective pairing of the plurality of pairings, a plurality of the testing being performed substantially simultaneously;
    based at least in part on the testing, receive results related to connectivity between each source component of the plurality of source components and each destination component of the plurality of destination components; and
    based at least in part on the results, generate a report related to connectivity between the plurality of source components and the plurality of destination components.

9. The non-transitory storage medium of claim 8, wherein the request identifies one or more ranges of Internet Protocol (IP) addresses for the plurality of source components.

10. The non-transitory storage medium of claim 9, wherein the request identifies multiple ranges of IP addresses for the plurality of source components, the multiple ranges of IP addresses for the plurality of source components being provided with Comma-Separated Values (CSVs).

11. The non-transitory storage medium of claim 10, wherein the request identifies one or more ranges of IP addresses for the plurality of destination components.

12. The non-transitory storage medium of claim 11, wherein the request identifies multiple ranges of IP addresses for the plurality of destination components, the multiple ranges of IP addresses for the plurality of destination components being provided with CSVs.

13. The non-transitory storage medium of claim 12, wherein a port is identified after each range of IP addresses for the plurality of destination components.

14. The non-transitory storage medium of claim 13, wherein the request comprises requesting testing of firewall connectivity with respect to the plurality of destination components.

15. A method within a wireless communication network comprising a plurality of servers, the method comprising:
receiving an input indicating a request to test connectivity between a plurality of source servers and a plurality of destination servers, the request being directed to testing the connectivity between each source server of the plurality of source servers and each destination server of the plurality of destination servers;
in response to receiving the request, automatically determine a plurality of pairings including a respective pairing between each source server of the plurality of source servers and each destination server of the plurality of destination servers;
in response, at least in part, to the input, testing connectivity between the corresponding source server and the corresponding destination server of each respective pairing of the plurality of pairings, a plurality of the testing being performed in parallel;
based at least in part on the testing, receiving results related to connectivity between each source server of the plurality of source servers and each destination server of the plurality of destination servers; and
based at least in part on the results, generating a report related to connectivity between the plurality of source servers and the plurality of destination servers.

16. The method of claim 15, wherein the request identifies one or more ranges of Internet Protocol (IP) addresses for the plurality of source servers.

17. The method of claim 16, wherein the request identifies multiple ranges of IP addresses for the plurality of source servers, the multiple ranges of IP addresses for the plurality of source servers being provided with Comma-Separated Values (CSVs).

18. The method of claim 15, wherein the request identifies one or more ranges of IP addresses for the plurality of destination servers.

19. The method of claim 18, wherein the request identifies multiple ranges of IP addresses for the plurality of destination servers, the multiple ranges of IP addresses for the plurality of destination servers being provided with CSVs, and wherein a corresponding port is identified after a corresponding CSV identifying a particular range of IP addresses for the plurality of destination servers, the corresponding port being separated from the corresponding CSV with a colon.

20. The method of claim 15, wherein the request comprises requesting testing of firewall connectivity with respect to the plurality of destination servers.

* * * * *